United States Patent [19]
Ishii et al.

[11] Patent Number: 5,461,400
[45] Date of Patent: Oct. 24, 1995

[54] DISPLAY DEVICE

[75] Inventors: Yutaka Ishii, Nara; Yoshitaka Yamamoto, Yamato-Koriyama, both of Japan

[73] Assignee: Sharp Kabushiki Kaisha, Osaka, Japan

[21] Appl. No.: 368,750

[22] Filed: Jan. 4, 1995

Related U.S. Application Data

[63] Continuation of Ser. No. 6,921, Jan. 22, 1993, abandoned.

[30] Foreign Application Priority Data

Jan. 24, 1992 [JP] Japan ..................... 4-011157

[51] Int. Cl.⁶ ..................................... G09G 3/18
[52] U.S. Cl. ............................. 345/182; 345/104
[58] Field of Search ................... 359/42, 45, 72, 359/55; 345/87, 104, 75, 82, 100, 173, 175, 179, 180, 182, 183

[56] References Cited

U.S. PATENT DOCUMENTS

| | | | |
|---|---|---|---|
| 4,467,325 | 8/1984 | Lustig | 345/207 |
| 4,685,195 | 8/1987 | Szydlo et al. | 437/41 |
| 5,053,765 | 10/1991 | Sonehara et al. | 345/4 |
| 5,168,382 | 12/1992 | Tsujikawa | 359/72 |

FOREIGN PATENT DOCUMENTS

| | | | |
|---|---|---|---|
| 0490484A3 | 6/1992 | European Pat. Off. | |
| 60-077228 | 5/1985 | Japan | 345/173 |
| 60-178526 | 9/1985 | Japan | 345/175 |
| 0186223 | 8/1987 | Japan | 359/72 |
| 0094322 | 4/1989 | Japan | 359/72 |
| 1-273019 | 10/1989 | Japan | 345/175 |
| 02089029 | 3/1990 | Japan. | |

OTHER PUBLICATIONS

<<CCD in Optical Touch Panels Deliver High Resolution>> by Bud K. Furk Electronic Design Sep. 1980 pp. 139–143.

*Primary Examiner*—Richard Hjerpe
*Assistant Examiner*—Lun-Yi Lao
*Attorney, Agent, or Firm*—David G. Conlin; George W. Neuner

[57] ABSTRACT

A display device provides a liquid crystal 41 served as a display medium, a plurality of pixel electrodes for driving the liquid crystal 41, a plurality of lower electrodes $x_1$ to $x_{128}$ and upper electrodes $Y_1$ to $Y_{100}$ ranged in the row or column direction, a plurality of photoconductive elements $S^X_{1,1}$ to $S^X_{128,100}$ and $S^Y_{1,1}$ to $S^Y_{128,100}$ provided on each of these pixel electrodes for electrically connecting or disconnecting the signal lines with or from the pixel electrodes, and a plurality of linear luminous bodies $X_1$ to $X_{128}$ and $Y_1$ to $Y_{100}$ provided in the column and row directions in a manner to selectively apply light to the photoconductive elements and control connection or disconnection of the photoconductive elements.

13 Claims, 9 Drawing Sheets

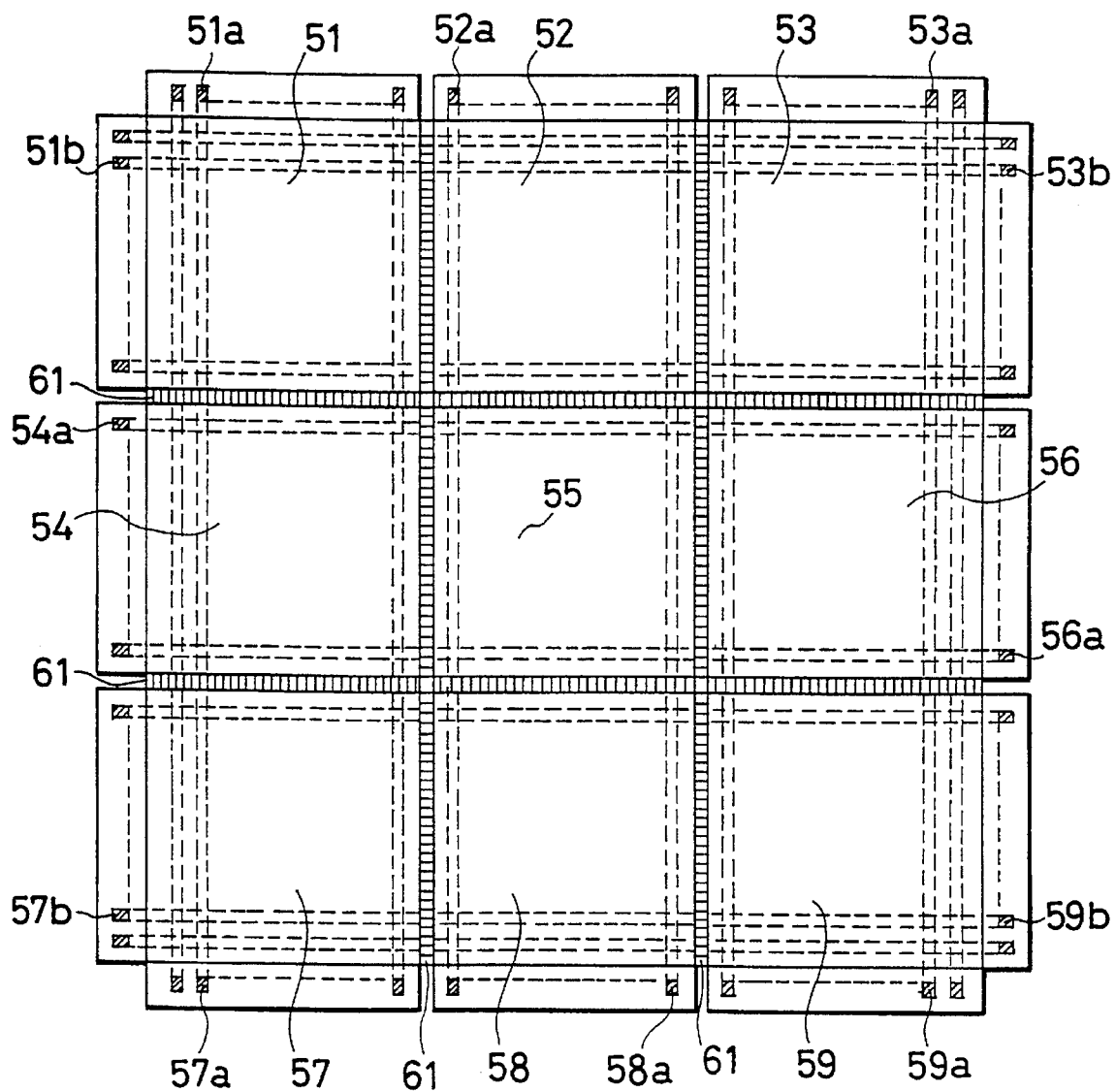

DISPLAY DEVICE

This is a continuation of copending application(s) Ser. No. 08/006,921 filed on Jan. 22, 1993 now abandoned.

BACKGROUND OF THE INVENTION

1. Field of the Invention

The present invention relates to a display device which can be used for audio visual equipment, office automation equipment or computers.

2. Description of the Related Art

In recent days, as the society keeps more highly informationized, demands are going up for a large-size and large-capacity display. In response to such demands, a CRT (cathode-ray tube) currently referred to as "King of a display" has developed to become more highly definitive and larger in size. The direct-view display reaches a 40-inch display and the projection display reaches a 200-inch display. However, the weight and the depth of the CRT itself becomes serious in light of realizing the large-capacity display. To overcome these serious respects, the drastic solution has been strongly required.

Steady study on a plane type display arranged to display an image on a different principle from the conventional CRT has been progressed to keep the display quality so high that the plane type display can be escaped from the current narrow range of uses for a wordprocessor machine and a personal computer and can be used for a hi-vision or a high-efficiency engineering workstation display.

As a plane type display, it is possible to refer to an ELP (electroluminescent panel), a PDP (plasma display panel), a VFD (fluorescent display), an ECD (electrochromic display) or a LCD (liquid crystal display). Of them, the LCD is the most promising device from viewpoints of feasibility of a full-color display and a matching characteristic to an LSI (Large Scale Integration). Under the circumstance, the technical progress for the LCD is the most remarkable.

The LCD is divided into a simple matrix driving type LCD and an active matrix driving LCD. The simple matrix driving LCD is structured to have an XY matrix panel composed of a pair of glass substrates having striped electrodes formed on each of them and a liquid crystal material injected therein. The acuteness entailed in the liquid crystal display characteristic is used for actuating the display function.

On the other hand, the active matrix driving type LCD is structured to directly add non-linear elements to pixels and use the non-linear characteristic of each element (switching characteristics or the like) for actuating the display function. As compared to the former simple matrix driving type LCD, therefore, the dependency of this LCD on the display characteristic of the liquid crystal itself is smaller, so that this LCD can realize a high-contrast and a highly responsive display. This kind of a non-linear element is divided into two-terminal type and a three-terminal type. As a two-terminal type non-linear element, an MIM (metal-insulation-metal) or a diode has been proposed. As a three-terminal type non-linear element, a TFT (thin-film transistor), an Si-MOS (silicon metal oxide semiconductor), or an SOS (silicon-on-saffire) has been proposed.

However, the simple matrix driving type LCD and the active matrix driving type LCD both involve such disadvantages in light of contrast, response speed and reliability as disabling to realize a large-size and large-capacitance display. This results in being unable to realize a sufficient performance of such a display.

That is, for the simple matrix driving type LCD, a ratio of an effective voltage applied into a selective pixel electrode to that applied into a non-selective pixel electrode comes closer to 1 as the number of scan lines is increased. This needs the liquid crystal itself to have an acute display characteristic. However, the feasible acuteness is limited. In the current state, the number of the scan lines is limited to about 400. Further, the response speed is likely to be contrary to the acuteness of the display characteristic. It means that the response speed is slower as the scan lines are increased in number. In general, when 400 scan lines are provided, the response speed is as slow as 100 ms to 300 ms. To realize the large-capacitance display, a method is often used where the signal lines are divided into an upper part and a lower part on a panel display and both of the upper and the lower parts are independently scanned. Concretely, if 400 scan lines are provided when not divided, the apparent number of the scan lines becomes 800. At a trial stage, the display capacitance consisting of 800×1024 lines is realized.

However, this method needs two drivers for data signal lines for the upper and the lower blocks. Hence, the number of the drivers is twice as many as that of the normal method, resulting in making the display more costly. Further, the display employing this method is superior in contrast and response speed to the active matrix driving type LCD. As the panel is made larger in size, the wiring length of the transparent electrode is made larger. This results in increasing the wiring resistance, thereby lowering the unevenness and the contrast on the display resulting from the attenuation of the data signal. Hence, for realizing the large-size and large-capacitance display, a drastic breakthrough is necessary.

On the other hand, for the active matrix driving type LCD, the switching characteristic and the non-linear characteristic of the non-linear element have been actively used. It is less remarkable in the quality of display than the simple matrix driving type LCD when the display has a large capacitance. However, in actual, the parasitic capacitance exists in the non-linear elements through the scan lines. Hence, the leakage of a scan electric signal to the pixel electrode lowers the contrast, brings about an after image, and lowers a lift of a panel. When increasing the display in size, the wiring length is made longer so that the increase of the wiring resistance and the parasitic capacitance cause a signal to be attenuated on the signal line. This has a great adverse effect on the evenness and the contrast of the display. Hence, for this type of LCD, an epochal new technology is promising for realizing the large-size and large-capacitance display.

Incidentally, viewing the market and use of the LCDs, a lap-top computer and a palm-top computer having the simple matrix driving type LCD and the active matrix driving type LCD mounted thereon are promising goods for attracting the market of the LCDs. In those goods, in particular, a portable data terminal such as a palm-top computer, the data input unit is important. To save the keyboard space, a handwriting input function is strongly desired.

As this function, it has been conventionally proposed to locate a tablet digitizer outside of a liquid crystal display and sense a location where data is input by a pen through the effect of the tablet. This tablet is an electromagnetic induction type, a resistance pressure-sensitive type and an electrostatic connecting type.

The electromagnetic induction type enables to realize a relatively high resolution but, as disadvantages, consumes a large power and is heavy. Further, it is easily influenced by a magnetic field.

The resistance pressure-sensitive type is so simple in structure that it is more advantageous in light of power consumption and weight. But, as disadvantages, it provides a low resolution and durability.

The electrostatic connecting type enables to realize a relatively high resolution but, as disadvantages, has difficulty in realizing a wireless pen and consumes a relatively high consumption. Further, it is weak to static electricity.

That is, currently, none of these types meet the needs and apply to a large-size liquid crystal panel.

SUMMARY OF THE INVENTION

It is therefor a primary object of the present invention to provide a plane type display device being capable of realizing a high-quality, large-size and large-capacitance display.

It is another object of the present invention to provide a plane type display device not only being capable of realizing a high-quality, large-size, large-capacitance display but also displaying characters input by hands.

In carrying out the primary object, a display device comprises a plurality of pixel electrodes for driving a display medium, a plurality of signal lines ranged in the row or column direction, a plurality of photoconductive elements provided for each of the pixel electrodes in a manner to electrically connect or disconnect the signal lines with or from the pixel electrodes, and a plurality of linear luminous bodies ranged in the row or column direction in a manner to selectively apply light to the photoconductive elements and control the connection or disconnection of the photoconductive elements.

Also, the primary object of the invention can be acheived by a display device comprising a plurality of display panels, each display panel arranged to have a display medium, a plurality of pixel electrodes for driving the display medium, a plurality of signal lines ranged in the row or column direction, a plurality of photoconductive elements formed on each of the pixel electrodes in a manner to electrically connect or disconnect the signal lines with or from the pixel electrodes, and a plurality of linear luminous bodies ranged in the column and row direction in a manner to selectively apply light to the photoconductive elements and control connection or disconnection of the photoconductive elements, the linear luminous bodies of the adjacent display panels being connected to each other by a light-connecting medium.

In operation, the plurality of linear luminous bodies are sequentially actuated to apply light to the photoconductive elements so that the impedances of the photoconductive elements are made conductive in response to the light. The active photoconductive elements serve to electrically connect the corresponding pixel electrodes with the signal lines. Hence, the voltage applied on the signal lines are applied to the pixel electrodes through the photoconductive elements. The photoconductive elements where no light is applied are kept nonconductive so that no substantial voltage is applied to the pixel electrodes. The voltage difference between the active and the nonactive photoconductive elements forms an image on the display medium. As described above, the pixel electrodes and the signal lines are connected or disconnected by the photoconductive elements which are made conductive only when they receive light. Hence, unlike the conventional arrangement, no performance degrade is brought about by the parasitic capacitance and the wiring resistance. Hence, this invention can realize a high-quality, large-size and large-capacitance display. Further, the plurality of display panels are connected by the light-connecting mediums so that the large-size and large-capacitance display can be easily carried out.

In carrying out the another object, a display device comprises present invention provides a display medium, a plurality of pixel electrodes for driving the display medium, a plurality of signal lines ranged in the row or column direction, a plurality of photoconductive elements ranged on each of the pixel electrodes in a manner to electrically connect or disconnect the signal lines with or from the pixel electrodes, a plurality of linear luminous bodies ranged in the column and row direction in a manner to selectively apply light to the photoconductive elements and control connection or disconnection of the photoconductive elements, light sensing means being provided at each one end of the linear luminous bodies and serving to sense the location of light incident to each of the linear luminous bodies, and display control means for displaying a location sensed by the light sensing means through the display medium.

Also, the another object of the invention can be achieved by a display device comprising a plurality of display panels, each display panel being arranged to have a display medium, a plurality of signal lines ranged in the row or column direction, a plurality of pixel electrodes for driving the display medium, a plurality of signal lines formed on each of the pixel electrodes in a manner to electrically connect or disconnect the signal lines with or from the pixel electrodes, a plurality of linear luminous bodies ranged in the column and row direction in a manner to selectively apply light to the photoconductive elements and control connection or disconnection of the photoconductive elements, light sensing means provided at each one end of the linear luminous bodies and serving to sense a location of incident light to each of these linear luminous bodies, and display control means for displaying the location sensed by he light sensing means through the display medium, the linear luminous bodies of the adjacent display panels being connected to each other by a light-connecting medium.

In operation, the light sensing means provided on each one end of the linear luminous bodies serve to sense a location of light incident to the plurality of linear luminous bodies. The display control means serves to control the display medium to display the location sensed by the light sensing means. That is, when the plurality of linear luminous bodies are active to apply light to the photoconductive elements, the light-applied photoconductive elements change their impedance so that they are made conductive. The active photoconductive elements serve to electrically connect the corresponding pixel electrodes with the signal lines. Hence, the voltage applied onto the signal lines is applied to the pixel electrodes through the photoconductive elements. The photoconductive elements where no light is applied are kept nonconductive so that no substantial voltage is applied to the pixel electrodes. The voltage difference between the active and the nonactive photoconductive elements serves to display an image of the location sensed by the light sensing means on the display medium. As described above, the pixel electrodes and the signal lines are connected or disconnected through the photoconductive elements which are made conductive in response to the light applied thereto. Hence, unlike the conventional arrangement, no performance degrade is brought about by the parasitic capacitance and the wiring resistance. This results in being able to implement a high-quality, large-size and large-capacitance display and display characters input by hands. Further, the plurality of display panels are connected by the light-connecting mediums, so that the large-size and large-capacitance display can be easily carried out.

Further objects and advantages of the the present invention will be apparent from the following description of the preferred embodiments of the invention as illustrated in the accompanying drawings.

BRIEF DESCRIPTION OF THE DRAWINGS

FIG. 7 is a plane view showing one example of a liquid crystal display device formed by pasting the display panels according to the embodiment shown in FIGS. 1 and 2 with each other for making the screen larger according to another embodiment of the first invention of this application.

BRIEF DESCRIPTION OF THE DRAWINGS

Figure 1:
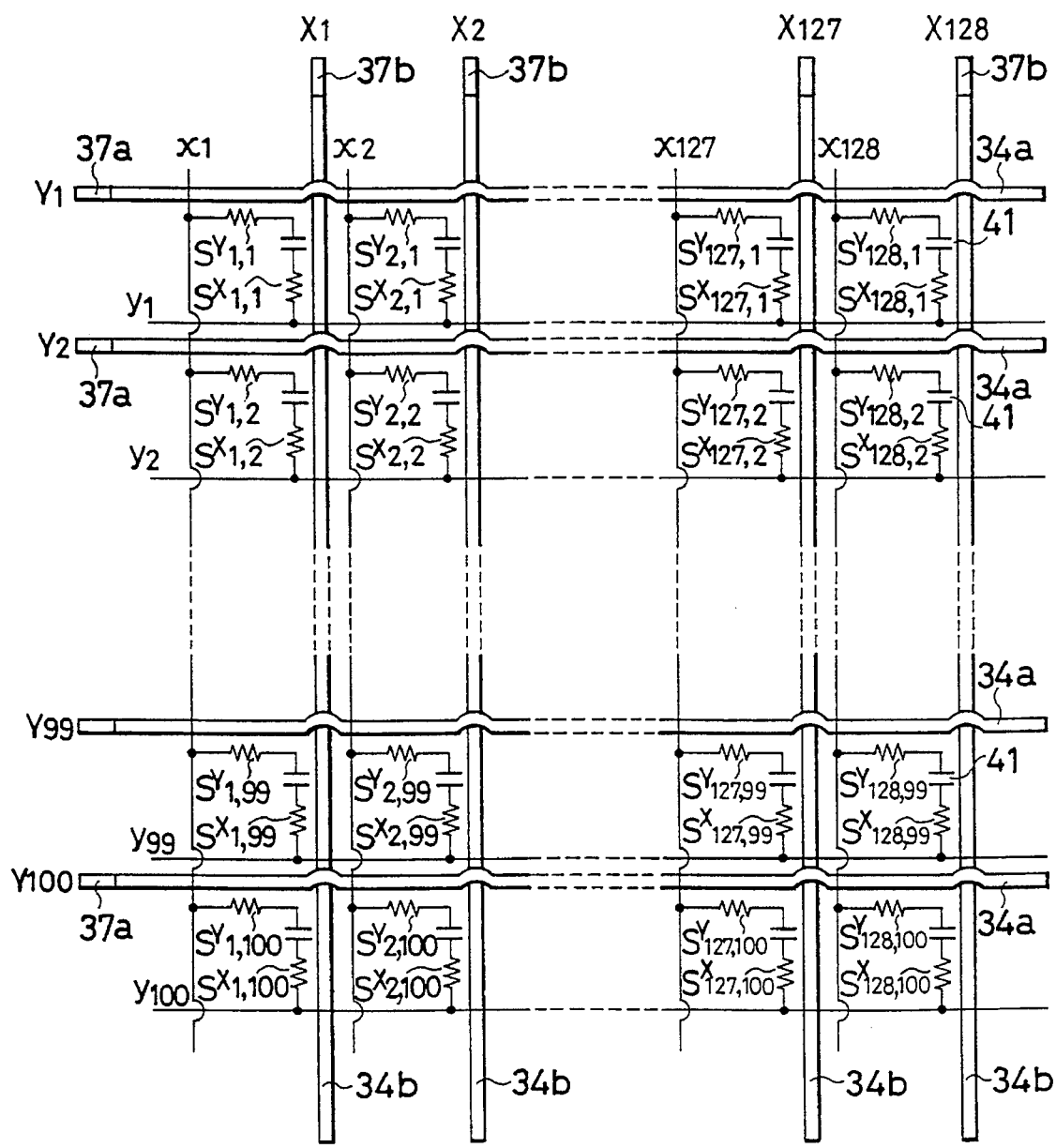
FIG. 1 is a schematic plane view showing an arrangement of a liquid crystal display panel included in the display device according to the first invention of this application for explaining the operation of the display panel.

Hereafter, embodiments of this invention will be described as referring to the drawings.

Figure 2:
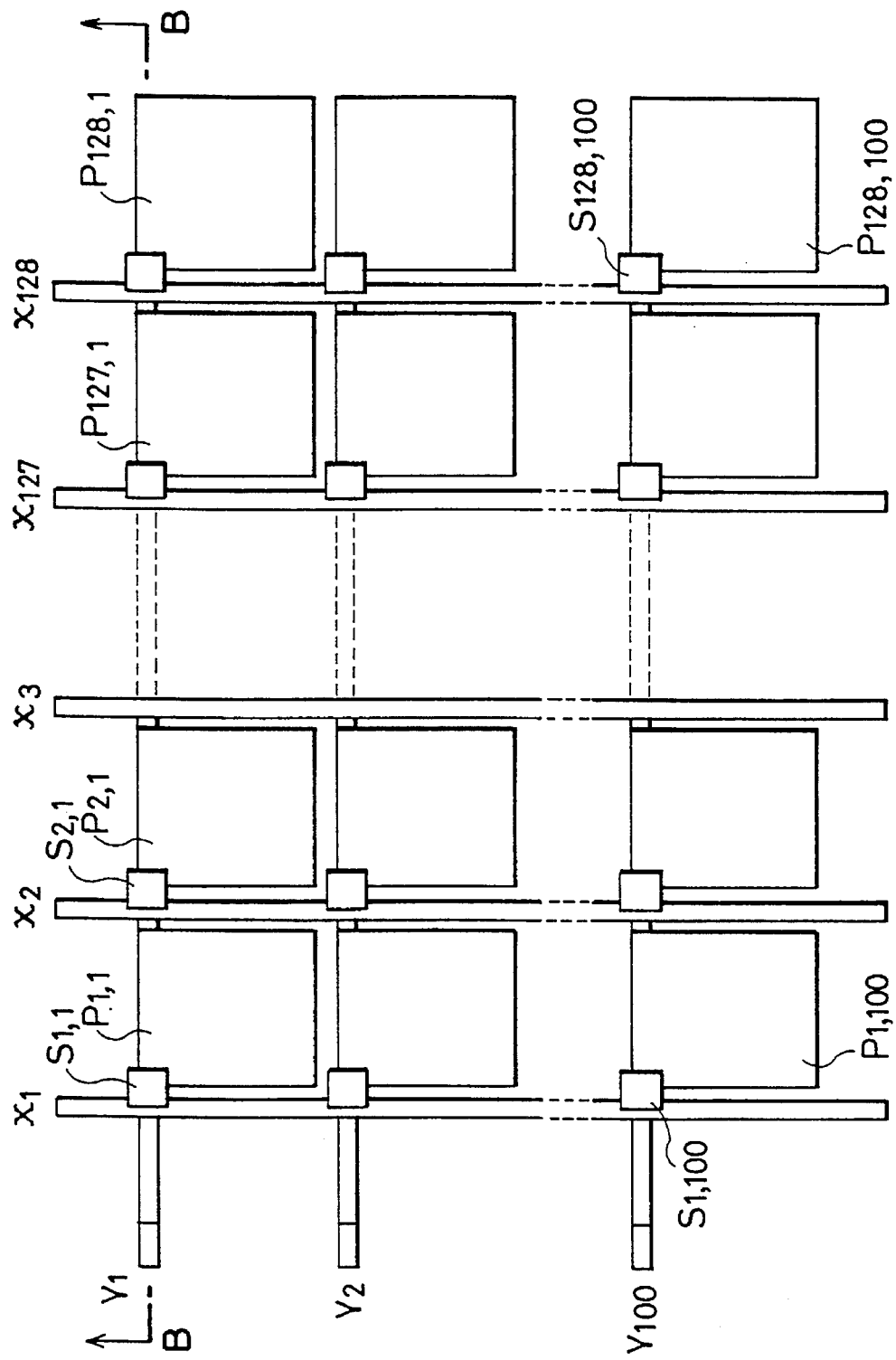
FIG. 2 is a plane view showing an light scan substrate included in the first embodiment of the display device according to the first invention of this application.

FIG. 2 is a plane view showing one example of a light scan substrate included in an active matrix type liquid crystal display device according to a first embodiment. In this embodiment, the display panel includes 100 (vertical) ×128 (horizontal) pixels. The display mode of the liquid crystal is a TN (twisted nematic) mode.

As shown, on the substrate, pixel electrodes $P_{1,1}$ to $P_{128,100}$ are ranged in a matrix format, in which 100 pixel electrodes are ranged in column (vertical) and 128 pixel electrodes are ranged in row (horizontal). For each of those pixel electrodes $P_{1,1}$ to $P_{128,100}$, photoconductive elements $S_{1,1}$ to $S_{128,100}$ are provided. For each column of the pixel electrodes $P_{1,1}$ to $P_{128,100}$, that is, $P_{1,1}$ to $P_{1,100}$, $P_{2,1}$ to $P_{2,100}$, ... $P_{128,1}$ to $P_{128,100}$, the signal lines $x_1$, $x_2$ ..., $x_{128}$ are formed on the same substrate in a manner to extend in the column direction. The signal lines $x_1$, $x_2$ ... $x_{128}$ are connected to the corresponding columns of the pixel electrodes $P_{1,1}$ to $P_{1,100}$, $P_{2,1}$ to $P_{2,100}$ ... $P_{128,1}$ to $P_{128,100}$ through the photoconductive elements $S_{1,1}$ to $S_{1,100}$, $S_{2,1}$ to $S_{2,100}$ ... $S_{128,1}$ to $S_{128,100}$.

The photoconductive elements $S_{1,1}$ to $S_{128,100}$ normally keep high impedance. When light hits them, their impedance lowers so as to selectively and electrically connect the signal lines $x_1$ to $x_{128}$ with the pixel electrodes $P_{1,1}$ to $P_{128,100}$.

For each row of the pixel electrodes $P_{1,1}$ to $P_{128,100}$, that is, each row $S_{1,1}$ to $S_{128,1}$, $S_{1,2}$ to $S_{128,2}$ ... $S_{1,100}$ to $S_{128,100}$ of the photoconductive elements, the linear luminous bodies $Y_1$ to $Y_{100}$ are formed on the same substrate in the row direction. Those linear luminous $Y_1$ to $Y_{100}$ are provided under the photoconductive elements $S_{1,1}$ to $S_{128,100}$ and the pixel electrodes $P_{1,1}$ to $P_{128,100}$ so as to selectively apply light onto the photoconductive elements $S_{1,1}$ to $S_{128,100}$.

Figure 3:
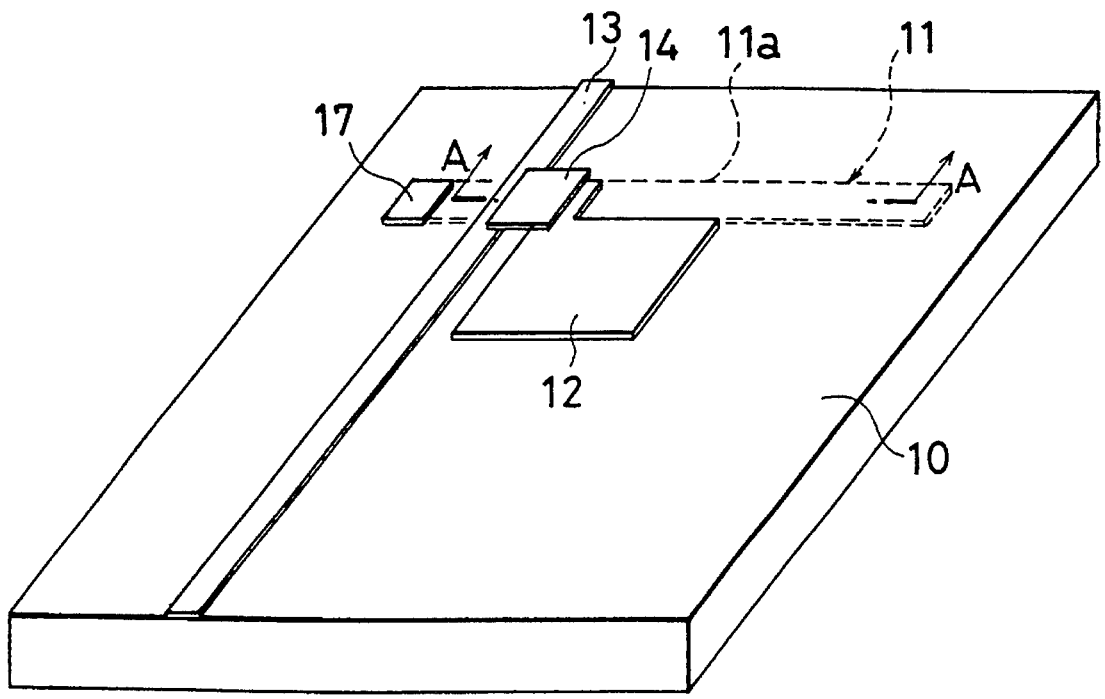
FIG. 3 is a perspective view showing the display device for explaining a connection portion between a pixel electrode and a signal line.
Figure 4:
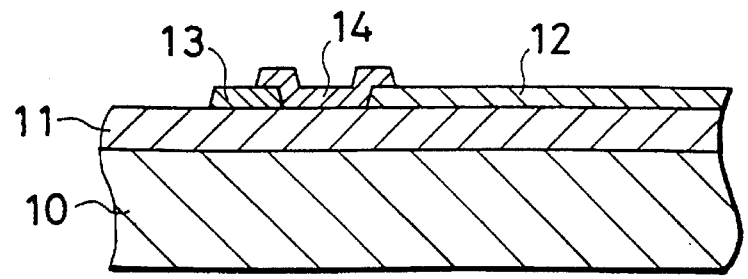
FIG. 4 is a sectional view on the line A—A of FIG. 3.

FIG. 3 is a perspective view showing a connecting portion between the pixel electrode and the signal line. FIG. 4 is a sectional view on the line A—A of FIG. 4.

As shown in FIGS. 8 and 4, for example, on a glass substrate 10 made of glass, a linear luminous body 11 is provided in a manner to extend in the row direction. On this linear luminous body 11, a photoconductive element 14 is located for electrically connecting and disconnecting (switching) a pixel electrode 12 with or from a signal line 18 for data in a manner to bridge them. The signal line 13 extends in the column direction.

As the photoconductive elements 14, $S_{1,1}$ to $S_{128,100}$, in this embodiment, a-Si (amorphous silicon) is used. As the linear luminous body 11, $Y_1$ to $Y_{100}$, any device may be used if it enables to linearly apply light. This embodiment, as shown in FIG. 3, uses the combination of a luminous source 17 made of an EL element and a linear light waveguide 11a having one end connected to it. When the luminous source 17 is made active to apply light, the light is applied to the light waveguide 11a so that the overall light waveguide 11a is made linearly luminous.

Figure 5:
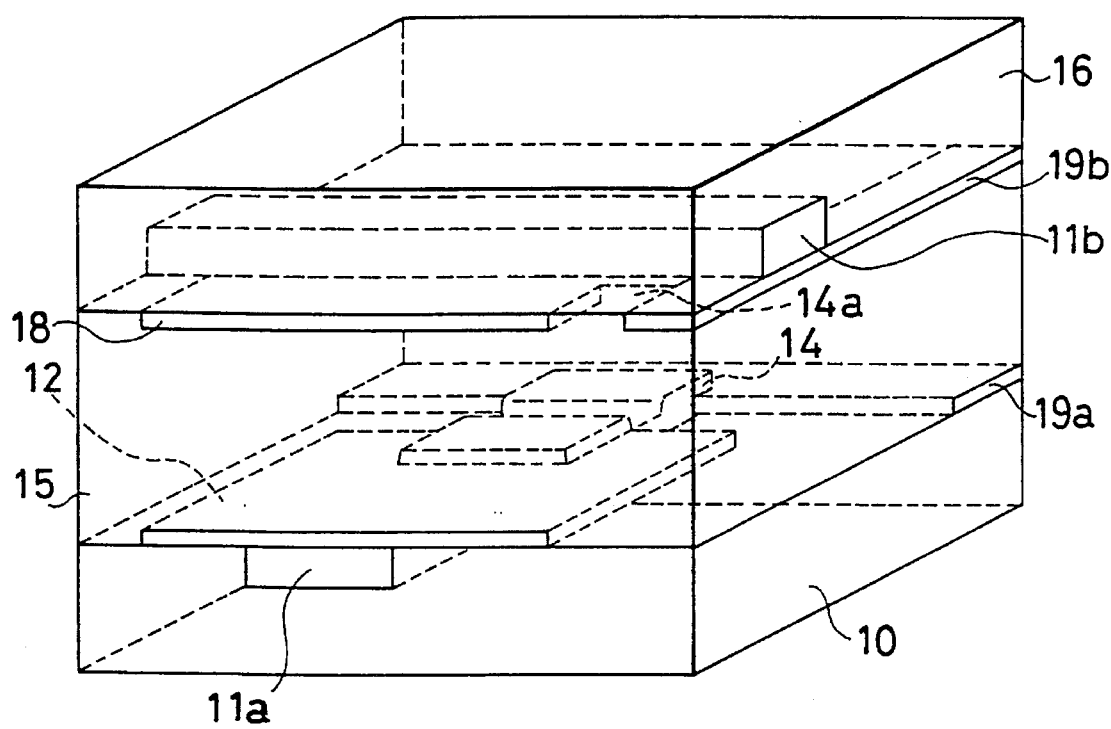
FIG. 5 is a perspective view showing one pixel of the liquid crystal display panel built into the light scan substrate included in the active matrix type liquid crystal display device shown in FIG. 2.

FIG. 5 is a perspective view showing one pixel of a liquid crystal panel having an light scan substrate included in the active matrix type liquid crystal display device shown in FIG. 2. As shown in FIG. 5, the same components as those shown in FIGS. 8 and 4 have the same reference numbers. Further, various thin films such as an orientation film and peripheral materials such as a sealing agent, a spacer and a backlight are not illustrative.

As shown, on the other glass substrate 16, a photoconductive element 4a, a light waveguide 11b, a pixel electrode 18 and an upper common electrode 19b are formed like the light scan substrate.

The lower light scan substrate as viewed in FIG. 5 and the substrate opposed to this light scan substrate (or the upper common substrate 19b and the lower common substrate 19a) are pasted to each other in a manner that the light waveguide 11a are located, for example, perpendicular to the light waveguide 11b. Liquid crystal 15 is injected between both of the substrates and is sealed. The resulting structure is a liquid crystal display panel.

Figure 6:
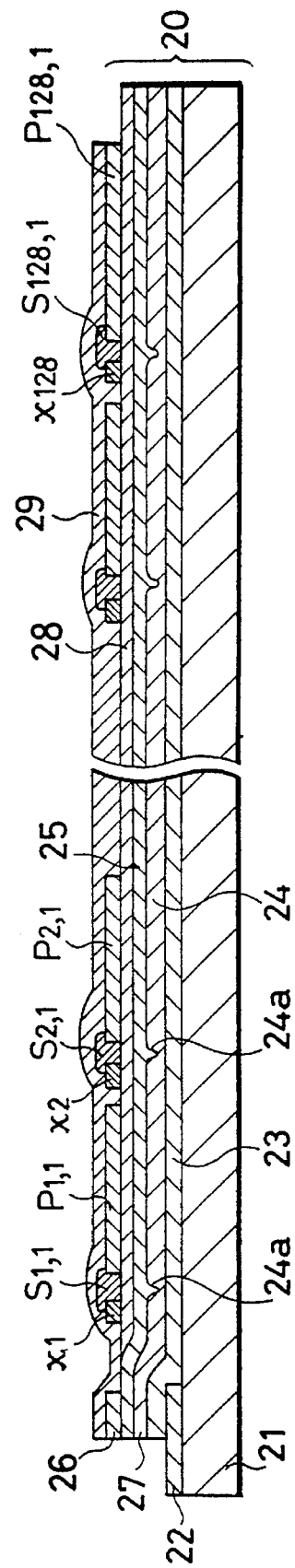
FIG. 6 is a sectional view showing an light scan substrate included in the active matrix type liquid crystal display shown in FIG. 2.

FIG. 6 is a sectional view showing an light scan substrate included in the active matrix type liquid crystal display device shown in FIG. 2.

As referring to FIG. 6, how to make the light scan substrate 20 will be described.

At first, an Al (aluminum) layer is formed on the glass substrate 21 by means of the EB (electronic beam) evaporating technique and then is etched for forming the lower electrode 22 of a luminous source made of an EL element. Next, Al$_2$O$_3$ (aluminum oxide) and Si$_3$N$_4$ (silicon nitride) are evaporated by the sputtering technique for forming an insulating film 23 on the glass substrate 21 and the lower electrode 22, the insulating film 23 having a thickness of about 2000 Å. Next, on the insulating film 23, the light waveguide 24 (corresponding to the linear luminous body Y1 shown in FIG. 2) made of ZnS (zinc sulfide) containing 0.5% of Mn (manganese) is formed by means of the EB evaporating technique in a manner to keep a thickness of about 8000 Å.

On the light waveguide 24, a cutaway 24 is etched at a lower spot of each of the photoconductive elements $S_{1,1}$ to $S_{128,1}$. On the etched cutaways, Si$_3$N$_4$ and SiO$_2$ (silicon oxide) are evaporated by the sputtering technique for forming an insulating film 25 having a thickness of about 2000 Å. Next, on the insulating film 25, ITO (oxide indium) is evaporated to keep a thickness of about 1500 Å and then etched for forming the upper electrode 26. The end of the light waveguide 24 laid between the lower electrode 22 and the upper electrode 26 composes the luminous source 27 made of the EL element.

Further, a polyimide layer 28 is formed for leveling the surface. Then, the signal lines $x_1$ to $x_{128}$ and the pixel electrodes $P_{1,1}$ to $P_{128,1}$ are formed by sputtering ITO on the polyimide layer 28.

The photoconductive elements $S_{1,1}$ to $S_{128,1}$ are formed on each cut-away 24a of the light waveguide 24 by forming an a-Si film having a thickness of about 1000 Å as a photoconductive layer by means of the plasma SCD method (chemical evaporating method) and then etching the a-Si film.

On the other hand, a substrate (not shown) opposed to this light scan substrate 20 is formed by the similar method to the light scan substrate 20.

On the surfaces of the opposed substrate and the light scan substrate 20, a polyimide film is coated as a horizontal orientation agent of the liquid crystal to have a thickness of about 500 Å and then is subject to rubbing. The light scan substrate 20 and the opposed substrate having the horizontal orientation agent formed thereon are pasted with each other by a sealing member with a spacer of 5 μm. Then, between the light scan substrate 20 and the opposed substrate, a PCH (phenylcyclohexane) system liquid crystal (ZLI-1585, manufactured by the MELK company) is injected in vacuum and sealed for forming the liquid crystal display panel.

In addition, as a display mode, it is preferable to employ a TN mode.

The description will be oriented to an operation of the liquid crystal display panel according to this embodiment.

FIG. 1 is a plane view schematically showing the operation of the liquid crystal display panel included in the display device according to the first embodiment.

As shown, the upper electrodes $Y_1$ to $Y_{100}$ are short-circuited for forming a common electrode. On the other hand, the lower electrodes x1 to x128 are similarly short-circuited for forming a common electrode. Between both of the common electrodes, there is applied a sufficiently higher voltage than a threshold voltage of the liquid crystal.

Next, by applying a voltage between the lower electrode 22 and the upper electrode 26 as shown in FIG. 6, an EL element 37a corresponding to the luminous source made of an EL element shown in FIG. 6 is made luminous. The light from the EL element 37a passes through a light waveguide 34a corresponding to the light waveguide 24 shown in FIG. 6 and applies to the photoconductive elements $S^Y_{1,1}$ to $S^Y_{128,1}$ formed on the light waveguide 24 as shown in FIG. 1.

When these photoconductive elements $S^Y_{1,1}$ to $S^Y_{128,1}$ receive this light, those elements lower their impedance so that they may be made conductive. In synchronism, only the image-matched portions on the EL element 37b formed on the opposed substrate are made luminous. As a result, this light passes through the light waveguide 34b so as to apply the light to the light waveguide elements $S^X_{1,1}$ to $S_{128,1}$ formed on the opposed substrate.

The light-applied photoconductive elements $S^X_{1,1}$ to $S^X_{128,1}$ lower their impedance so as to make those elements conductive.

Hence, a voltage is applied only onto the pixel electrode connected to the light-applied photoconductive elements $S^X_{1,1}$ to $S^X_{128,1}$.

As described above, the linear luminous bodies $Y_1$ to $Y_{100}$ for each row are made sequentially luminous. In synchronism, the linear luminous bodies $X_1$ to $X_{128}$ for data are made luminous in a manner to match a desired display pattern.

After a selecting period when light is applied onto the photoconductive element has passed, a non-selecting period (when no light is applied) comes, when the photoconductive elements keep the impedance high. For this purpose, the charges injected to the pixel electrodes are held by the capacitance of the liquid crystal element until the next selection is carried out. This operation principle is the same as the conventional TFT-LCD.

However, in the display device according to this embodiment, since each pixel electrode is scanned by light, like the conventional TFT-LCD, no unfavorable condition takes place where a gate signal is leaked to the pixel electrode by means of the parasitic capacitance between the gate electrode and the drain electrode connected to the pixel electrode. Therefore, no relevant unfavorable conditions take place such as lowering of contrast, an after image, and lowering of a life resulting from distortion of a negative and a positive symmetric voltage waveform of a signal caused by d.c. components derived from the leaked signal. The conventional TFT-LCD is arranged to add a parasitic capacitance for one scan onto one gate electrode. For the large-size and large-capacitance LCD, therefore, this parasitic capacitance and the wiring resistance cause the gate signal to be attenuated. This attenuation results in making the contrast lower and the display uneven. On the other hand, the display device according to this embodiment is arranged to scan the image by light. No problems about the parasitic capacitance and the wiring resistance are brought about.

Further, the display is allowed to be implemented by optically scanning the image and applying as a data signal an electric signal onto the lower electrodes $x_1$ to $x_{128}$. That is, in this embodiment, the upper electrodes $Y_1$ to $Y_{100}$ correspond to the common electrodes for the pixel elements, respectively. Hence, this embodiment does not need the linear luminous bodies $X_1$ to $X_{128}$ and the photoconductive elements $S^X_{1,1}$ to $S^X_{128,100}$.

However, as compared to the arrangement where the display is allowed to be carried out by optically scanning the image and applying an electric signal onto the lower electrodes $x_1$ to $x_{128}$ as a data signal, the foregoing embodiment is arranged to reduce the leakage of stored charges into the pixels where no light is applied, because two photoconductive elements keeping the impedance higher when the pixels are non-active are connected in series to the pixels. Hence, it is possible to obtain a clear image with few strokes.

In actual, the display test was performed by using the liquid crystal display panel according to this embodiment. The test proved that the uniform contrast was achieved on the display and the after image and the contrast degrade were not recognized when displaying a pattern of a still picture for a long time.

The linear luminous body 11, the light waveguides 24, 34a and 34b, the luminous source 27, the EL elements 37a and 37b and the linear luminous bodies $Y_1$ to $Y_{100}$ and $X_1$ to $X_{128}$ are one embodiment of linear luminous bodies. The pixel electrode 12 and the pixel electrodes $P_{1,1}$ to $P_{128,100}$ are one embodiment of the pixel electrodes. The photoconductive elements 14, $S_{1,1}$ to $S_{128,100}$, $S^x_{1,1}$ to $S^x_{128,100}$ are one embodiment of the photoconductive elements. The liquid crystal 41 is one embodiment of a display medium. The lower electrodes $x_1$ to $x_{128}$ and the upper electrodes $Y_1$ to $Y_{100}$ are one embodiment of the signal lines.

FIG. 7 is a plane view showing one example of a liquid crystal display device made by a plurality of display panels according to the embodiment as shown in FIGS. 1 and 2 for making the screen larger, the liquid crystal display device corresponding to another embodiment of the first invention.

As shown in FIG. 7, the display device according to this embodiment provides nine display panels 51, 52, 53, 54, 55, 56, 57, 58 and 59 having the fundamentally same arrangement as the display panel according to the embodiments shown in FIGS. 1 and 2.

The display panel 51 provides a luminous source 51a at the upper end and a luminous source 51b at the left end. The display panel provides a luminous source 53a at the upper end and a luminous source 53b at the right end. The display panel 57 provides a luminous source 57a at the lower end and a luminous source 57b at the left end. The display panel 59 provides a luminous source 59a at the lower end and a luminous source 59b at the right end. The display panel 54 provides a luminous source 54a at the left end. The display panel 56 provides a luminous source 56a at the right end. The display panel 58 provides a luminous source 58a at the lower end.

Each of the luminous sources 51a, 51b, 52a, 53a, 53b, 54a, 56a, 57a, 57b, 58a, 59a and 59b is made of an EL element.

The display panel 55 has no luminous source but only a light waveguide.

The nine display panels 51, 52, 53, 54, 55, 56, 57, 58 and 59 are pasted with one another through a fiber plate 61 manufactured by Asahi Garasu, LTD. (Ashahi Glass, Ltd.) so that the light waveguides for scanning the display panels are optically connected with the corresponding light waveguides for data.

A display device arranged as above was manufactured to have a display area of 30 cm×30 cm. It is assured that a large screen can be implemented.

The display panels 51, 52, 53, 54, 55, 56, 57, 58 and 59 are one embodiment of the display panel according to the first invention of this application.

The lower electrodes $x_1$ to $x_{128}$ and the upper electrodes $Y_1$ to $Y_{100}$ are served as common electrodes and are connected by the corresponding panel terminals between the adjacent display panels.

Since this display device provides each one electrically connecting portion between the adjacent panel displays on the upper and the lower substrates, unlike the conventional electrically scan type display device, it is unnecessary to implement an electrically high-density connection at the scan side electrode and the data electrode between the devices. This results in quite easily implementing a large screen.

According to this embodiment, the fiber plate is used for connecting the display devices. In place of the fiber plate, it is possible to use an optical part such as a cell hook lens array or a micro lens array or an adjusting agent for an index factor such as Si (silicon) oil.

It is effective to conceal the joints between the display panels for improving the quality of the display screen by forming the liquid crystal dispersed into a high molecular network, a so-called high-molecular dispersing type liquid crystal without having to use the seals in the liquid crystal panels.

As this kind of high-molecular dispersing type liquid crystal, it is possible to use an encapsulated liquid crystal, a polymer compound hardened in a uniform solution of the liquid crystal and the polymer compound by UV (Ultraviolet) or heat, the uniform solution consisting of liquid crystal, the combination of polymer and common solvent from which the common solvent is evaporated for removal, the cooled uniform solution consisting of a heated and melt liquid crystal and thermoplastic resin, and the liquid crystal dipped in a sponge cellulose film or micron-size glass grains. For example, it is possible to take the manufacturing steps of uniformly mixing a photo-polymerization starting agent in a mixing solution of 2-ethyl ethyl acrylate (monomer): urethane acrylate oligomer : ZLI-1840 (manufactured by the Melk Company)=16:24:60, sealing the mixture inside of the panel, and applying UV to the sealed mixture.

In the embodiment shown in FIGS. 1 and 2, the luminous source made of an EL element is provided at only one end. But, it is effective to provide the luminous source at both ends of the light waveguides.

According to the foregoing embodiments, one luminous source made of an EL element for one scan line is provided. It is possible to provide a plurality of luminous sources for one scan line at one side or both sides of the scan line. The provision of the luminous sources offers a far larger effect.

Further, the micro-optics technique may be used. For example, fibers are structured to be buried in the glass substrate. Or, the light waveguide is preformed on the glass substrate by means of an ion-implanting technique. Then, after manufacturing the panel, the EL element and the optically scanning light source such as a laser element are formed on another substrate. Next, the substrate may be connected to a desired panel through the optical connecting medium for forming the operative display screen.

FIG. 8 is a sectional view for describing a connecting portion between a pixel electrode and a signal line.

As described in the foregoing embodiments, the photoconductive element may be structured to bridge the signal line and the pixel electrode as shown in FIG. 4. The structure is not limited to the structure shown in FIG. 4. It is possible to employ the structures as shown in FIG. 8A, 8B and 8C.

Figure 8A:
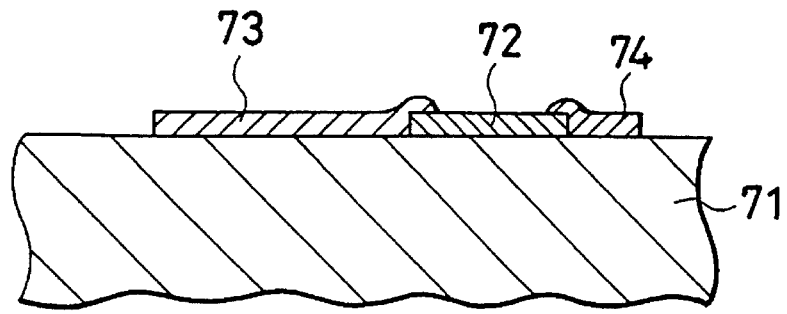
FIGS. 8a, 8b and 8c are sectional views showing a connection portion between a pixel electrode and a signal line for explaining it.
Figure 8B:
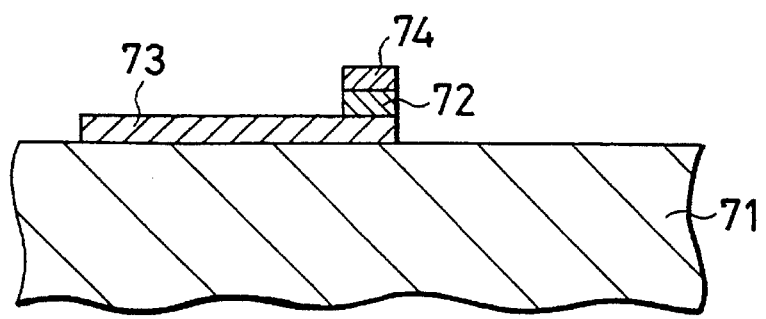
Figure 8C:
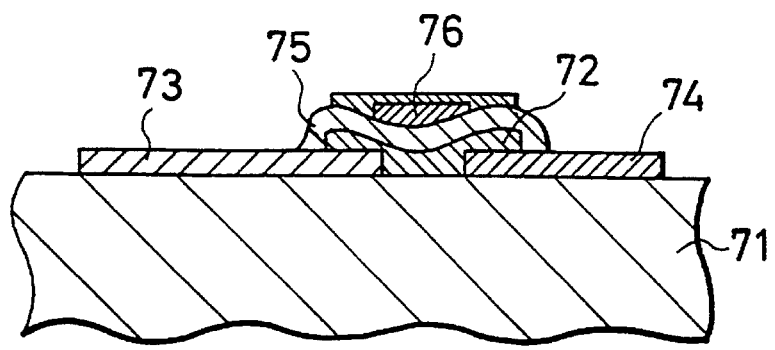

That is, as opposed to the structure shown in FIG. 4, as shown in FIG. 8a, on the top of a photoconductive element 72 formed on the insulating film or the glass substrate 71, the end of a pixel electrode 73 and a side of an electrode 74 are laid. As shown in FIG. 8b, on the end of the pixel electrode the photoconductive element 72 and the electrode 74 are laminated. Further, as shown in FIG. 8c, on the end of the pixel electrode 73 and the side of the electrode 74 separated from each other, the photoconductive element 72, the insulating film 75 and a light-cutting mask 76 are laminated in the describing sequence.

As a material for the light waveguide, in place of the above-mentioned ZnS containing 0.5% of Mn, any material may be used if it has a larger factor of index than that of the substrate having the light waveguide formed thereon.

Further, to suppress the change of impedance of a photoconductive element by the ambient light, a light-cutting layer may be formed on the upper or lower surface of the photoconductive element. To prevent diffusion of light passing through the light waveguide (linear luminous body) into the area except where the photoconductive elements are located, it is effective to protect the light waveguide (linear luminous body) with a light-reflecting layer made of metal.

As the substrate, by mounting a color filter or applying a color display mode such as a guest host mode as a liquid crystal, a reflective type or transparent type full-color or multi-color display is allowed to be implemented. In place of the TN mode, it is possible to use an STN (Supertwisted nematic) mode, a phase transition mode and an ECB (Electrical Controlled Birefringence) mode. Further, By using the ferroelectric liquid crystal, the anti-ferroelectric liquid crystal, a smectic liquid crystal having an electro-clinic effect, or a liquid crystal having a flexo electro-clinic effect, it is possible to realize a display device with a wide angle of view.

As the photoconductive element, in addition to a-Si, it is possible to use an amorphous silicon system inorganic material such as a-SiC (amorphous carbide silicon), a-SiN (amorphous nitride silicon), an amorphous chalcogenide system inorganic material such as a-Se (amorphous selenium), a-Se.Te, a-As$_2$Se$_3$, an inorganic liquid crystal such as ZnO, CdS (cadmium sulfide), BSO (Bi$_{12}$SiO$_{20}$: bismuth silicate) or BGO (Bi$_{12}$GeO$_{20}$), or an organic material such as a polyvinyl carbazole or a bisazo pigment organic photoconductive element.

As the linear luminous body, in place of the combination of the luminous source made of an EL element and a linear light waveguide, it is possible to use the linear EL element, the combination of a linear light waveguide and an LED (light-emitting diode) or a semiconductor laser or a vaccume fluorescent display (VFD).

As the display medium, it is possible to use the LCD, the ECD, the EPID (electrophoretic display). However, for realizing a full-color display, the LCD is the most promising.

Next, the description will be oriented to a tablet function provided in the display device.

Figure 9:
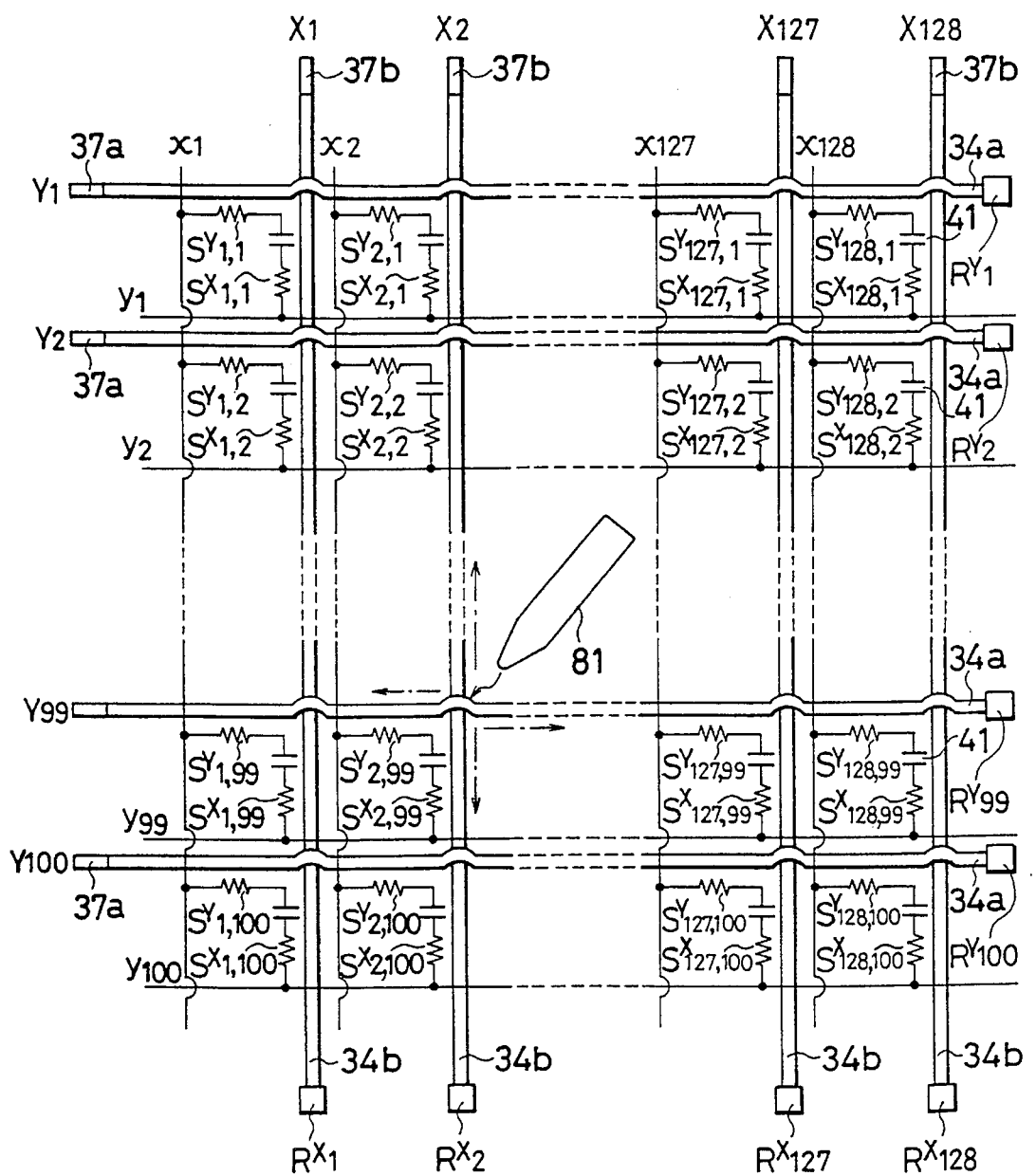
FIG. 9 is a schematic plane view showing one embodiment of a liquid crystal display panel for explaining a tablet function of the display device according to the second invention of this application.

FIG. 9 is a plane view schematically showing an arrangement of a liquid crystal display panel for describing a tablet function of the display device according to the second invention of this application.

As shown, the liquid crystal display panel according to this embodiment has the same arrangement as the liquid crystal display panel as shown in FIG. 1 except that photo-sensors $R^Y_1$ to $R^Y_{100}$ and $R^X_1$ to $R^X_{128}$ are provided at the end portions of the light waveguides 34a and 34b, respectively. Hence, the same components of this embodiment shown in FIG. 9 have the same reference numbers as the arrangement shown in FIG. 1.

As a light pen 81 made of a laser or an LED comes closer to any location of the liquid crystal display, the light emitted from the light pen 81 intrudes into the inside of the display panel. The part of the emitted light is entered into the light waveguides 34a and 34b.

The lights entered into the light waveguides 34a and 34b are guided in the scanning direction and the data direction if the light components match to the waveguide conditions. As a result, the photo-sensors $R^Y_1$ to $R^Y_{100}$ and $R^X_1$ to $R^X_{128}$ provided at the ends can sense the location in the scanning direction and the data direction.

As shown in FIG. 9, the photo-sensors $R^X_2$ and $R^Y_{99}$ indicate the sensitivity so that it is understood that the light pen 81 is located at a crosspoint between the light waveguides 34b and 34a of the linear luminous body $X_2$ and the linear luminous body Y99.

The light entered from the light pen 81 into the light waveguide gives an adverse effect on the sensitivity of the photoconductive elements $S^X_{1,1}$ to $S^X_{128,100}$ and $S^Y_{1,1}$ to $S^Y_{128,100}$. This adverse effect results in having an adverse effect on the display.

As a remedy for this adverse effect, it is possible to select a light wavelength of the light pen by considering the wavelength characteristic of the sensitivity of the photoconductive element.

For example, in the case of using a-Si as the photoconductive element, the sensitivity of this material is abruptly attenuated if the wavelength reaches 700 nm or more. Hence, as the light pen, it is better to use a light source for emitting a ray of light having a relatively long wavelength, for example, a semiconductor laser for emitting a ray of light with a wavelength closing to about 800 nm.

Further, by considering that the locational accuracy is made worse by the ambient light, it is preferable to switch on and off the light output of the light pen at a particular frequency and intensity for separating the ambient light.

The foregoing embodiment has concerned the arrangement where the EL elements 37a and 37b are separated from the photo-sensors $R^Y_1$ to $R^Y_{100}$ and $R^X_1$ to $R^X_{128}$. It is possible to combine those components and provide the combination at one side or both sides of the ends of the light waveguides 34a and 34b for sensing the location where the data is input by the light pen.

In the structure where a plurality of display panels as shown in FIG. 7 are pasted, the input location of the light pen is allowed to be sensed on the foregoing principle.

If the input location is allowed to be sensed, the combination of this arrangement and a computer results in realizing a handwritten character recognizing apparatus which is capable of recognizing handwritten characters.

Figure 10:
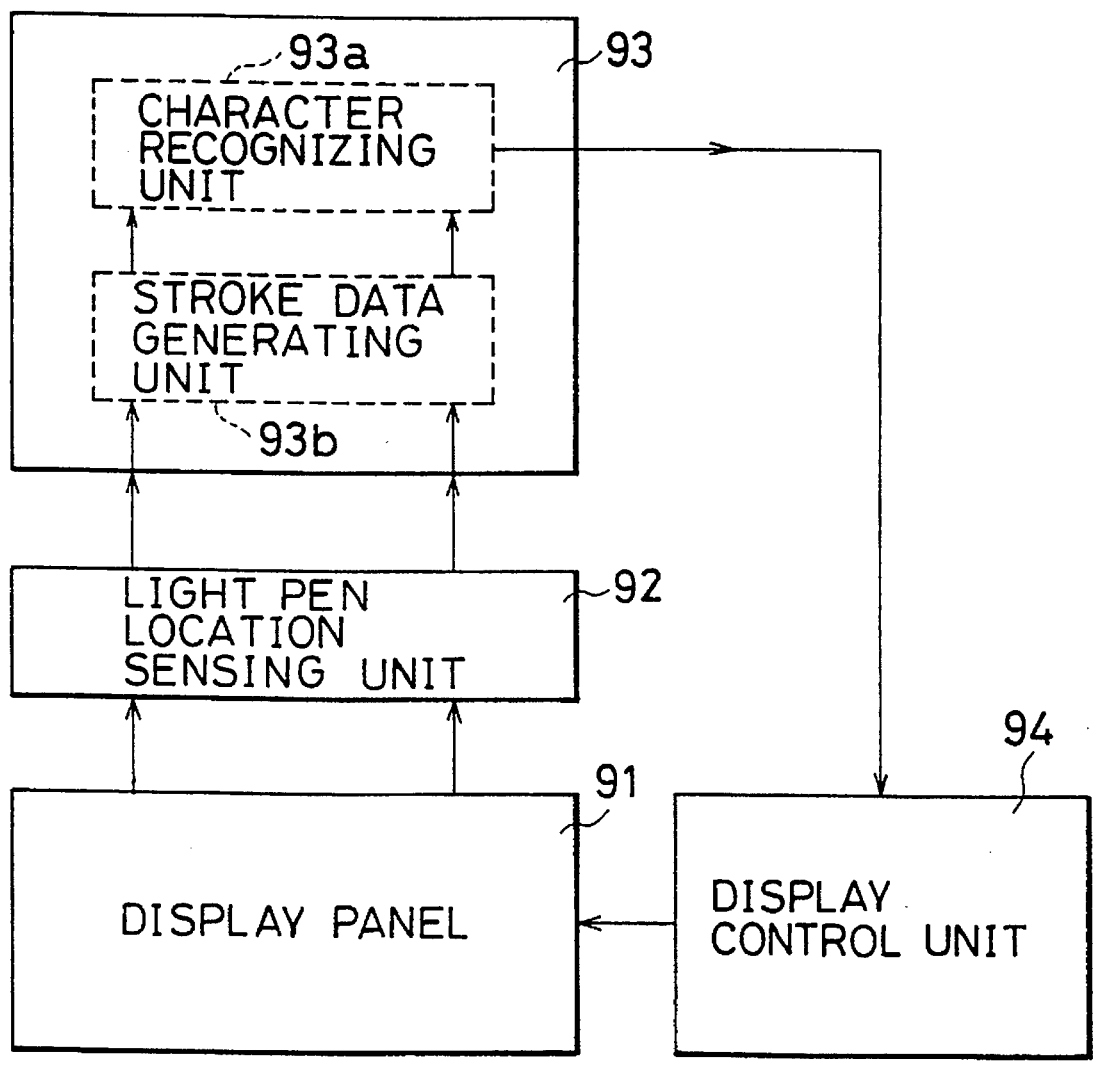
FIG. 10 is a block diagram showing an embodiment of a handwritten character recognizing device.

FIG. 10 is a block diagram showing an arrangement of this handwritten character recognizing apparatus according to an embodiment.

As shown, the handwritten character recognizing apparatus provides a display panel 91.

The computer 93 contains a character recognizing unit 93a and a stroke data generating unit 93b.

A light pen location sensing unit 92 serves to sense a location of the light pen on the display panel 91 based on a signal sent from the display panel 91 in response to the light from the light pen and a computer 93 recognizes a character, a figure, or a symbol based on the sensed data and displays the recognized character or the like on the display panel 91 through the effect of a display control unit 94.

The linear luminous body 11, the light waveguides 24, 34a and 34b, the luminous source 27, the EL elements 37a and 37b, the linear luminous bodies $Y_1$ to $Y_{100}$ and $X_1$ to $X_{128}$ are one embodiment of the linear luminous bodies. The pixel electrode 12 and the pixel electrodes $P_{1,1}$ to $P_{128,100}$ are one embodiment of the pixel electrodes. The photoconductive elements 14, $S_{1,1}$ to $S_{128,100}$, $S^X_{1,1}$ to $S^X_{128,100}$ and $S^X_{1,1}$ to $S^Y_{128,100}$ are one embodiment of the photoconductive elements. The liquid crystal 41 is one embodiment of a display medium. The light pen location sensing unit 92, the computer 93 and the display control unit 94 are one embodiment of the display control means. The photo-sensors $R^X_1$ to $R^X_{128}$ and $R^Y_1$ to $R^Y_{100}$ are one embodiment of the light sensing means. The lower electrodes $x_1$ to $x_{128}$ and the upper electrodes $Y_1$ to $Y_{100}$ are one embodiment of the signal lines.

According to this embodiment, by forming a light waveguide inside of the display panel, it is possible to sense a location of the light pen. By combining it with the computer, it is possible to recognize a handwritten character. The conventional system where a tablet panel is laminated on the display panel disadvantageously makes the device larger in thick and weight and the error of the locational accuracy according to each parallax more variable. On the other hand, the display device according to the second invention has no disadvantage. Further, the input pen may be arranged to be wireless, so that the input operation may be easily done.

Hence, this display device is quite useful for a hi-vision, an engineering workstation, a display for various multimedia-corresponding equipment, an information board, a display for an environment image provided with a handwriting function such as an electronic board, a tile type display adjusted to any form (display having display panels respectively served as one unit ranged in a tile manner).

Like the display device shown in FIG. 7, according to another embodiment of the second invention of this application, it is possible to easily make the screen larger by pasting a plurality of display panels according to the embodiment shown in FIG. 9.

As described above, the first aspect of the invention provides a display device comprising a display medium, a plurality of pixel electrodes for driving the display medium, a plurality of signal lines ranged in a row or column direction, a plurality of photoconductive elements provided on the plurality of pixel electrodes and for electrically connecting or disconnecting the signal lines with or from the pixel electrodes, respectively, and a plurality of linear luminous bodies ranged in the column and row directions in a manner to selectively apply a ray of light to the photoconductive elements and control the connection or disconnection of the photoconductive elements. Hence, the connection or disconnection between the pixel electrodes and the signal lines is carried out by the photoconductive body which is made conductive in response to the light. Hence, unlike the prior art, the parasitic capacitance and the wiring resistance do not degrade the performance so that the display device may implement a high-quality, large-size and large-capacitance display.

Also, according to the first aspect of the invention, a plurality of display panels as described above are provided on the plane in a manner that the linear luminous bodies of the adjacent display panels may be connected to each other by the light-connecting medium. Hence, the large-size and large-capacitance display is allowed to be easily performed.

The second aspect of the invention provides a display device comprising a display medium, a plurality of pixel electrodes for driving the display medium, a plurality of signal lines ranged in the row or column direction, a plurality of photoconductive elements provided on each of the plurality of pixel electrodes for electrically connecting or disconnecting the signal lines with or from the pixel electrodes, a plurality of linear luminous bodies provided in the column and the row directions in a manner to selectively apply light to the photoconductive elements and control connection or disconnection of the photoconductive elements, light sensing means provided at each one end of the plurality of linear luminous bodies and for sensing a location of light incident to the linear luminous body, and display control means for displaying a location sensed by the light sensing means through the display medium. This invention is capable of sensing the location of light incident to the linear luminous body and thus recognizing a handwritten character or the like. The conventional display system where tablet panels are laminated on the display panel is disadvantageously made the device larger in thickness and weight or the error of the locational accuracy according to each parallax more variable. On the other hand, the display device according to the second invention of this application does not involve such disadvantages.

The second aspect of the invention also provides a plurality of display panels as described above on the plane in a manner that the linear luminous bodies of the adjacent display panels are connected to each other by the light-connecting mediums. Hence, the large-size and large-capacitance display is allowed to be easily realized.

Many widely different embodiments of the present invention may be constructed without departing from the spirit and scope of the present invention. It should be understood that the present invention is not limited to the specification, except as defined in the appended claims.

What is claimed is:

1. A display device comprising:
   a display medium disposed between two substrates;
   a plurality of pixel electrodes disposed on each of said substrates for driving said display medium;
   a plurality of signal lines ranged in the row or column direction on said each substrate;
   a plurality of photoconductive elements provided respectively on a plurality of said pixel electrodes of at least one substrate for electrically connecting said signal lines with said pixel electrodes selectively;
   a plurality of linear luminous bodies arranged in the column or row direction in said at least one substrate in a manner to selectively apply light to said photoconductive elements in order to control electrical conductivity of said photoconductive elements;
   light sensing means disposed at one end of each of a plurality of said linear luminous bodies and for sensing a location of a light incident to at least one of said linear luminous bodies; and
   a light pen for designating a position on a display surface, having light emitting means for emitting a light with a wavelength out of range of ambient light wavelengths to be entered into said at least one of said linear luminous bodies, said wavelength of light emitted by the light emitting means of said light pen corresponding with wavelength of light to which said light sensing means responds.

2. A display device according to claim 1, wherein said display medium is liquid crystal.

3. A display device according to claim 1, wherein said pixel electrodes are arranged in matrix.

4. A display device according to claim 1, wherein said signal lines are arranged to be substantially perpendicular to said linear luminous bodies in one substrate.

5. A display device according to claim 1, wherein each of said photoconductive elements is provided in a manner to bridge between one data line and one pixel electrode.

6. A display device according to claim 1, wherein each of said luminous bodies is made of amorphous silicon.

7. A display device according to claim 1, wherein each of said luminous bodies includes an EL element and a linear light wave guide having one end connected to said EL element.

8. A display device according to claim 1, wherein said two substrates are juxtaposed to each other in a manner that the signal lines of one substrate is perpendicular to the signal lines of the other substrate.

9. A display device according to claim 1, wherein said signal lines of each substrate are shortcircuited to form common electrode.

10. A display device according to claim 9, further comprising:

voltage applying means for applying between two common electrodes a voltage higher than a threshold voltage of said display medium; and means for making sequentially the luminous bodies of one substrate luminous and making the luminous bodies of the other substrate luminous in a manner to match a desired display pattern.

11. A display device according to claim 1, further comprising:

display control means for displaying a location sensed by said light sensing means through said display medium.

12. A display device according to claim 1, wherein said light emitted from said light pen has a wavelength not affecting said photoconductive elements.

13. A display device according to claim 1, wherein said light pen includes means for flickering the light output of said light pen at a particular frequency.

* * * * *